Nov. 18, 1952  F. E. HUMMEL  2,618,219
COOKING UTENSIL
Filed Dec. 8, 1947
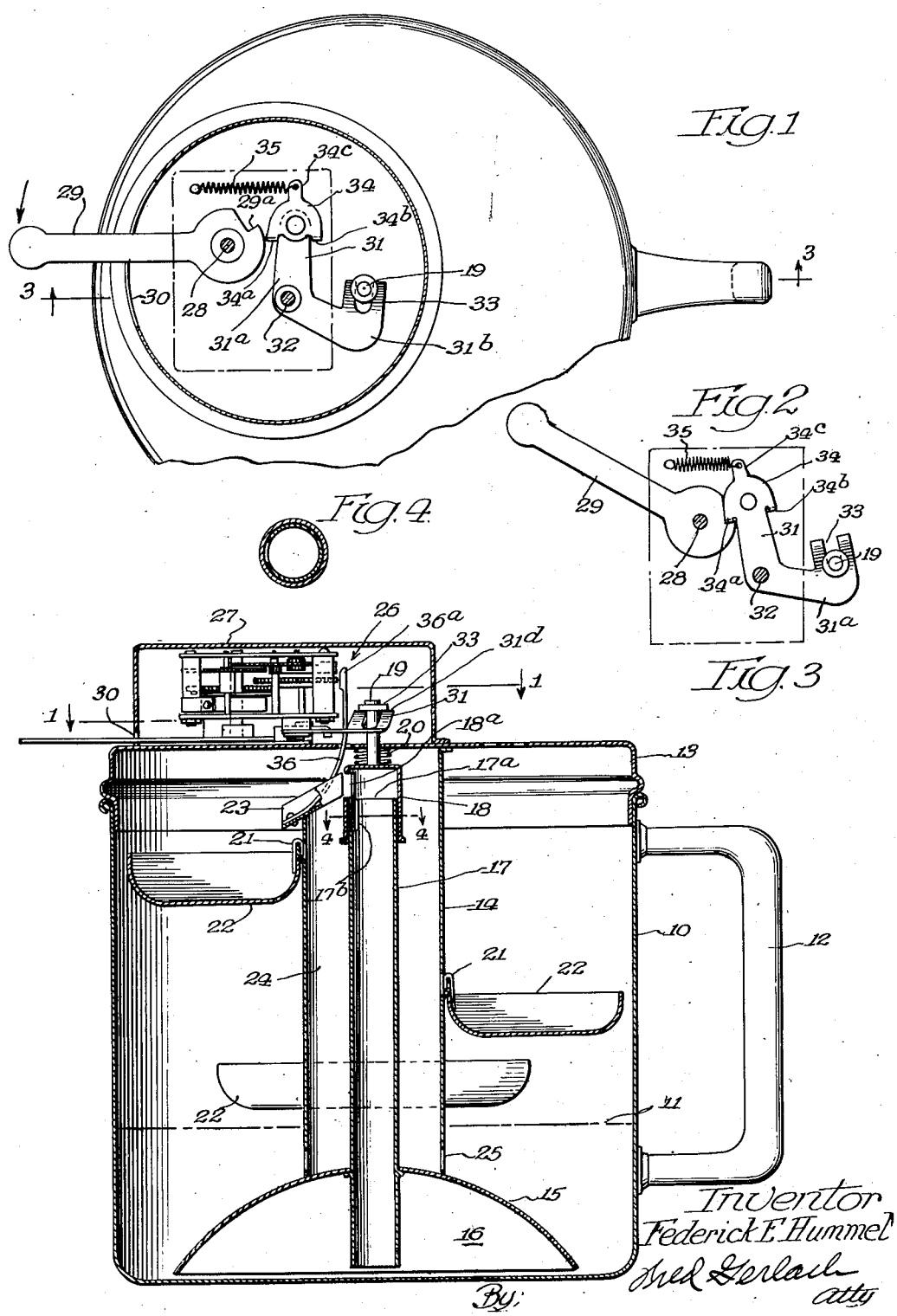

Patented Nov. 18, 1952

2,618,219

UNITED STATES PATENT OFFICE 2,618,219

COOKING UTENSIL

Frederick E. Hummel, Chicago, Ill.

Application December 8, 1947, Serial No. 790,305

6 Claims. (Cl. 99—330)

This invention pertains to cooking utensils and has to do more especially with a utensil for poaching eggs, but which, however, is adaptable to other useful purposes.

My immediate object is to provide an egg-poaching utensil of relatively small over-all dimensions which, accordingly, requires only a small amount of storage space, and which is provided with automatic timing means by virtue of which the eggs are invariably poached to precisely the intended degree, irrespective of whether the cooking water is boiling hot, lukewarm or cold when the operation is started.

A further object is to provide a reliable, well-constructed utensil of the above indicated character which can be produced cheaply enough to be readily saleable to people of average means—it being fully realized that a utensil of the specialized character here dealt with will not find many buyers aside from public eating places unless the price is low enough to offset the fact that the utensil is a convenience in the nature of a luxury rather than a necessity.

One of the novel and significant features of my present invention is that it utilizes a hot water fountain similar to that of an ordinary coffee percolator to produce a stream or shower of hot water which is caused to cascade downwardly upon and flow over the eggs being poached—wherefore the eggs are not immersed in a cumulus of hot water and for that reason are not subjected to poaching temperature after the hot water ceases to flow over them.

Another feature resides in the provision of a valve or diverter means which causes the stream of hot water to be directed into contact with the eggs during the prescribed cooking period, and which automatically diverts the hot water away from the eggs upon expiration of the cooking period.

Still another feature consists in the provision of thermostatic means which automatically blocks the timing mechanism and thus prevents starting thereof until water of a predetermined temperature commences flowing over the eggs—thus ensuring that the eggs will be poached to a definite uniform degree for each given time period.

An additional feature consists in the provision of a spring-driven timing mechanism whereby the timing of the eggs can accurately be fixed in advance by winding the driving spring to an extent corresponding to the desired poaching time—this being effected, preferably, by means of a manually operable winding lever which may be and preferably is associated with a suitably calibrated scale whereby the operator of the utensil can readily ascertain the extent to which the lever must be moved for any specific timing period within the range of the mechanism.

Other objects, features and advantages of my invention will become apparent as the ensuing detailed description progresses.

An egg-poaching utensil incorporating the novel features of my invention is illustrated in the drawing which accompanies this specification; but this showing is only by way of example and not by way of limitation, and it is to be understood that the invention is susceptible of numerous modifications and is not to be regarded as more limited in scope than is indicated by the terms of the appended claims.

In the drawing:

Fig. 1 is a fragmentary plan view of the utensil, being taken at line 1—1 of Fig. 3;

Fig. 2 is a detail view illustrating the action of the timing mechanism;

Fig. 3 is a vertical sectional view of the utensil taken approximately at line 3—3 of Fig. 1; and Fig. 4 is a section at line 4—4 of Fig. 3.

The utensil illustrated comprises a sheet metal receptacle 10 of cylindrical form adapted to be filled with water up to about the level indicated at 11. A handle 12, attached to receptacle 10, may be provided for convenient handling, or the utensil may, alternatively, be equipped with a wire bail.

The upper end of receptacle 10 is closed by a removable sheet metal cover 13 having a depending peripheral skirt which fits the receptacle snugly, but not so tightly as to render removal difficult.

Attached to the under side of cover 13 and depending therefrom toward the bottom of the receptacle is a tubular member 14 to the lower end of which is secured a sheet metal dome 15, the peripheral edge of which is spaced slightly above the bottom of the receptacle so as to permit water to penetrate into the space 16 beneath the dome.

Disposed concentrically with the tubular member 14 and secured to dome 15 is a tubular riser or conduit 17, the lower end of which extends downwardly from the top of the dome to a point just above the bottom of receptacle 10. The upper end of riser 17 terminates at 17a and it is cut away at 17b, as shown in Fig. 4, to form a discharge port as hereinafter explained.

Telescopically engaging the upper end portion of riser 17 and movable vertically relatively thereto is a tubular cap 18 which functions as a valve or diverter and has a lateral opening 18a. The cap or valve 18 is shown in its up position wherein the opening 18a is situated above the discharge port 17a; but said cap is adapted to move downwardly to a position wherein the opening 18a registers with the discharge port 17a.

An upwardly projecting valve stem 19 is attached to the valve or cap 18 and extends through an opening in the cover 13; and a compression spring 20 encircling said valve stem is arranged to press downwardly on the valve or cap 18, thus tending to move the opening 18a into alignment with port 17a.

The tubular member 14 is pierced and embossed to form four sockets, spaced in quadrature around said member and at different levels, which sockets are each adapted to receive the free end of a hook 21—each of which hooks is welded to a cup-like tray 22. Said trays are detachable from tubular member 14 and each is proportioned to hold one egg prepared for poaching; that is to say, from which the shell has been removed.

Attached to the upper end of tubular member 14 is a channel-like chute or spout 23 which slopes downwardly toward the uppermost one of the four trays 22; and the upper end of said spout is so disposed as to be in registration with the opening 18a when the cap 18 is in its up position as shown in Fig. 3.

When heat is applied to the bottom of the receptacle, pressure is built up within the space 16 beneath the dome 15 in excess of the pressure above the water level within receptacle 10, and as a result hot water is forced upwardly through riser 17. If the cap 18 is in its up position the hot water thus forced upwardly through the riser will discharge through opening 18a onto spout 23 and will flow downwardly through said spout onto the egg in the uppermost tray 22; and the overflow from the top tray will cascade downwardly onto the next lower tray and thence to the third and fourth trays in succession. The eggs are poached by the stream of hot water flowing over them, and the overflow from the bottom tray returns to the cumulus in the bottom of receptacle 10 from which, after reheating, it again passes upwardly through riser 17 to repeat the cycle.

On the other hand, when valve 18 is in its down position the opening 18a is in registration with discharge port 17b, and the water moving upwardly through riser 17, if any, is discharged below spout 23 into the annular space 24 through which it returns by gravity, via apertures 25, to the bottom of receptacle 10.

The main objective is to flow a stream of hot water over the eggs for a prescribed period of time and to shut off the flow of hot water more or less abruptly at the end of the prescribed cooking period. By so doing it can be made certain that the eggs will invariably be poached to the desired consistency.

Pursuant to the foregoing objective, the cap or valve 18 is arranged to be lifted to its up position, as shown in Fig. 3, prior to the commencement of each cooking period and concurrently with the winding up of a spring-driven timing mechanism 26, so that the hot water, when it starts flowing, will pass through spout 23 and onto the eggs in the tray.

The timing mechanism 26 is a clockwork device comprising a spiral driving spring together with a train of gears and an escapement—all of more or less conventional construction such as found in ordinary alarm clocks—and does not need to be described in minute detail. Said mechanism is mounted on the cover 13 and enclosed within a sheet metal housing 27 which is removably attached to said cover.

The driving spring of the timing mechanism is anchored at its inner end to a shaft 28, see Fig. 1, to the lower end of which is secured a lever 29 serving as a medium for manually winding the spring. The long arm of said lever extends outwardly through a slot 30 along the bottom edge of housing 27, which slot is long enough to permit the lever to turn through a considerable angle.

A bellcrank 31 pivoted at 32 comprises a first arm 31a and a second arm 31b, which latter is bifurcated at its distal end to embrace valve stem 19 at a point below a flange or washer 33 which is secured to said valve stem. The bifurcated end of arm 31a is bent to form a sloping cam surface 31c and terminates in a short horizontal portion 31d at the extreme end of the arm which portion lies in a plane parallel to the main part of arm 31b and constitutes a bearing surface on which the flange or washer 33 rests when the bellcrank is in the position in which it is shown. It will be observed that the bellcrank is shown functioning to hold the valve 18 in its up position against the pressure of spring 20.

Bellcrank 31 is capable of rotating counter-clockwise from the posture in which it is shown in Fig. 1 to that of Fig. 2, and when it is so rotated it allows the washer 33 to slide downwardly along the sloping cam surface 31c, thus lowering valve stem 19 and valve 18, so that the latter occupies its previously-described down position.

To the distal end of bellcrank arm 31a is pivotally connected a flipper member 34 having two fingers 34a and 34b located at either side of arm 31a and adapted to engage said arm at opposite edges, but spaced apart sufficiently so that the flipper member is capable of oscillating through a small angle about its pivotal center. Said flipper member also has an arm 34c to which is connected a biasing tension spring 35 which functions to bias bellcrank 31 in the counterclockwise direction. It will be apparent that the flipper member 34 is a hinged extension of bellcrank arm 31a; and its function will presently be explained.

When the timing mechanism is run down—which is the normally inactive condition—the lever 29 is postured as depicted in Fig. 2 wherein it will be seen that the finger 34a overlies the shoulder 29a formed on winding lever 29; and it will further be seen that by reason of the position of shoulder 29a the bellcrank 31 is so postured angularly as to release the valve stem 19, wherefore the valve 18 is down.

By rotating lever 29 counterclockwise from the posture in which it is shown in Fig. 2, to that in which it is shown in Fig. 1, the driving spring of the timing mechanism is partially wound but capable of being wound still more by further rotation of lever 29, as will be evident from examination of Fig. 1, wherein it will be seen that slot 30 allows of considerable additional rotation of said lever in the counterclockwise direction.

Due to the fact that shoulder 29a is radial to the center of lever 29 and the further fact that the complementary surface of finger 34a is so directed that it lies parallel to shoulder 29a when the two are in vis-a-vis relation, the lever 29 would be latched by finger 34a against counterclockwise rotation from the posture depicted in Fig. 2 were it not for the fact that flipper member 34 is rotatable through a sufficient angle to allow finger 34a to revolve about the pivotal center of the flipper to a degree which enables the shoulder 29a to escape. The need for the flipper member could be avoided were it not for the fact that it is desirable to lower valve 18 abruptly at the termination of each cooking period. However, it is not at all indispensable to the successful operation of my invention that the cooking period be terminated abruptly; and consequently it is not essential, although desirable, to include the flipper member 34 in the timing mechanism.

Rotating the winding lever 29 counterclockwise from the posture in which it is shown in Fig. 2 winds the driving spring proportionately to the degree of angular movement of said lever; and the time required for lever 29 to return, under control of the escapement, to the posture in which it is shown in Fig. 2 is proportionate to the extent to which the lever is rotated counterclockwise from that posture. At the commencement of each winding operation flipper member 34 is forcibly moved out of its overlapping relation to shoulder 29a into the posture in which it is shown in Fig. 1, wherein it bears against the arcuate peripheral surface of the hub of the lever. This movement of the flipper member is accompanied by a resultant clockwise rotation of bellcrank 31, which causes the valve stem 19 and valve 18 to be lifted.

If, perchance, the water is not hot enough to be fully effective, it would not be permissible for the timing mechanism to start counting off time because if it did the valve 18 would be lowered to its down position before the eggs were fully poached. In fact, the valve might, in some instances, be lowered before the hot water actually started flowing over the eggs. For that reason I have provided means in the form of a thermostatic element 36 which functions to prevent operation of the timing mechanism, after winding, until the hot water is actually flowing through spout 23 and is up to the required temperature. Element 36 is a bi-metallic strip riveted at its lower end to spout 23, where it is contacted by hot water flowing through the spout, and is so designed that, when cold, its upper or free end 36a functions as a detent to engage a gear or other moving part of the timing mechanism and thus prevent time-counting operation of said mechanism. This does not interfere with the winding of the driving spring. As soon as water of the requisite temperature starts flowing through spout 23, it raises the temperature of bi-metallic element 36 causing it to bend so that the detent 36a disengages the gear and allows the timing mechanism to start. At that point the timing commences and the lever 29 moves clockwise until it resumes the posture in which it is shown in Fig. 2, whereupon bellcrank 31 rotates counterclockwise under the impetus of spring 35 and thus causes valve 18 to be lowered, so that the hot water is thereafter diverted through port 17b below spout 23 into the annular space 24.

The poaching time depends upon the angle through which lever 29 is rotated, and, of course, the timing can be varied accordingly. Where it may be desired to resort to different cooking periods as, for example, two, three or four minutes, calibration marks and timing indicia can be engraved or stamped on the housing 27 adjacent a suitable indicator on lever 29, such as one edge thereof; in which event the operator would move said lever when winding the spring, to register with the calibration corresponding to the desired cooking period.

The whole sub-assembly carried by cover 13 is removable with the cover from receptacle 10, and it must be removed in order to load and unload the trays. The usual procedure is to detach trays 22 for loading and unloading. A suitable handle, not shown, should be provided for lifting the sub-assembly.

It will be apparent that the utensil illustrated and described can be modified in numerous respects without departing from the scope and spirit of my invention and, accordingly, I do not wish to be limited except as indicated by the terms of the appended claims.

Having described my invention, what I claim as new and wish to secure by Letters Patent is:

1. The combination in a cooking utensil, of a receptacle adapted to hold water, a tube within said receptacle and extending upwardly from a point below the water level therein to a point above the water level, means whereby heat applied to the bottom of the receptacle causes water to flow upwardly through said tube, means for supporting comestibles within said receptacle above the level of the water therein, a spout located near the top of said tube and operative to direct water emerging from the top of the tube downwardly onto the comestibles, a valve located at the top of said tube and operative in a first position to direct the water emerging from said tube into said spout and operative in a second position to direct the water away from said spout, a spring-driven timing mechanism operative upon being wound to move said valve to said first position and further operative upon being unwound to move said valve to said second position.

2. The combination in a cooking utensil, of a receptacle adapted to hold water, a tube within said receptacle and extending upwardly from a point below the water level therein to a point above the water level, means whereby heat applied to the bottom of the receptacle causes water to flow upwardly through said tube, means for supporting comestibles within said receptacle above the level of the water therein, a spout located near the top of said tube and operative to direct water emerging from the top of the tube downwardly onto the comestibles, a cap telescopically engaging the top portion of said tube and reciprocable vertically thereon, said cap having a lateral opening which registers with said spout when said cap is in its up position, said opening being below said spout when said cap is in its down position, spring-driven timing mechanism operative upon being wound to lift said cap to its up position and again operative upon becoming unwound to lower said cap to its down position.

3. The combination in a cooking utensil, of a receptacle adapted to hold water, a removable cover for said receptacle, a tubular member located co-axially with and depending from said cover into said receptacle, a plurality of trays detachably supported by said tubular member exteriorly thereof and located at different levels, said trays being spaced around said tubular member in consecutively overlapped relation and all located above the normal water level in the receptacle, a dome secured to the lower end of said tubular member and defining with the bottom of the receptacle a substantially confined space, a vertical tubular conduit passing through the apex of said dome and upwardly through said tubular member and downwardly to a point near the bottom of the receptacle, and means for directing hot water from the top of said conduit downwardly onto the uppermost of said trays, the orientation of the trays being such that the cascading hot water is temporarily intercepted by each of the trays in turn.

4. The combination in a cooking utensil, of a receptacle adapted to hold water, a removable cover for said receptacle, a tubular member coaxial with and depending from said cover downwardly into said receptacle, means carried by said tubular member, exteriorly thereof and within said receptacle and above the water level therein for supporting comestibles, a dome secured to the lower end of said tubular member and overlying the bottom of the receptacle to form a partially confined space, a tubular conduit extending vertically from a point near the bottom of the receptacle through the apex of said dome to a point above said comestible-supporting means, a spout arranged to direct water emerging from the top of said conduit onto the comestibles, a valve connected to the top of said conduit and operative in a first position to direct water from said conduit into said spout and operative in a second position to divert the water emerging from said conduit away from said comestibles, a spring-driven timing mechanism mounted on said cover and operatively associated with said valve, said timing mechanism being operative upon being wound to move said valve to said first position and further operative upon becoming unwound to move said valve to said second position, and thermo-responsive means arranged to be acted upon by the heat of water emerging from said conduit, said thermo-responsive means being operative to block said timing mechanism except when the temperature of the water emerging from said conduit is above a certain predetermined value.

5. The combination in a cooking utensil, of a receptacle adapted to hold water, a removable cover for said receptacle, means within said receptacle and above the normal water level therein for supporting comestibles, said means being suspended from said cover and removable therewith from the receptacle, a vertical conduit carried by said cover and extending from a point near the bottom of the receptacle to a point above said comestible-supporting means, means for forcing hot water from the bottom of said receptacle upwardly through said conduit, means for directing hot water from the top of said conduit onto the comestibles, a valve operative in a first position to guide water emerging from said conduit onto said directing means and operative in a second position to divert the water away from said means, a spring-driven timing mechanism mounted on said cover and operatively connected with said valve, said timing mechanism being operative while being wound and in response thereto to move said valve to said first position and further operative upon becoming unwound to move said valve to said second position, a bi-metallic thermostatic element normally effective to block time-counting operation of said mechanism, but operative to unblock said mechanism when the temperature of the water emerging from said conduit is above a certain predetermined value, said element being so situated that it is impinged upon by water emerging from said conduit.

6. The combination in a cooking utensil, of a receptacle adapted to hold water, a removable cover for said receptacle, a conduit within said receptacle suspended from said cover and removable therewith, said conduit extending upwardly from a point below the water level in said receptacle to a point above the water level, means whereby heat applied to the bottom of the receptacle causes water to flow upwardly through said conduit, diverting means for changing the course of the water emerging from the top of said conduit, spring-driven timing mechanism mounted on said cover and operative while being wound to move said diverting means to a first position and further operative following a predetermined time interval after being wound and released to move said diverting means to a second position, and a bi-metallic strip disposed in the path of the water emerging from said conduit, said strip being anchored at one end and having a detent at its distal end normally operating to block time-counting operation of said mechanism, said strip being operative when heated to a predetermined temperature to withdraw said detent and thus release said mechanism to start the time-counting operation.

FREDERICK E. HUMMEL.

REFERENCES CITED

The following references are of record in the file of this patent:

UNITED STATES PATENTS

| Number | Name | Date |
| --- | --- | --- |
| 429,139 | Malen | June 3, 1890 |
| 1,582,685 | Pence | Apr. 27, 1926 |
| 1,865,973 | Shields | July 5, 1932 |
| 1,887,848 | Peirce | Nov. 15, 1932 |
| 1,887,849 | Peirce | Nov. 15, 1932 |
| 1,916,369 | Harpster | July 4, 1933 |
| 2,036,933 | Gomes | Apr. 7, 1936 |
| 2,276,540 | Harding | Mar. 17, 1942 |

FOREIGN PATENTS

| Number | Country | Date |
| --- | --- | --- |
| 495,669 | Great Britain | Nov. 17, 1938 |